(12) United States Patent
Chamberlain et al.

(10) Patent No.: US 9,588,873 B1
(45) Date of Patent: Mar. 7, 2017

(54) USING CORE FILES TO DEVELOP DIAGNOSTIC PROGRAMS

(71) Applicant: International Business Machines Corporation, Armonk, NY (US)

(72) Inventors: Richard N. Chamberlain, Southhampton (GB); Howard J. Hellyer, Hampshire (GB); Matthew F. Peters, Hampshire (GB); Adam J. Pilkington, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/867,171

(22) Filed: Sep. 28, 2015

(51) Int. Cl.
*G06F 9/44* (2006.01)
*G06F 11/36* (2006.01)
*G06F 9/445* (2006.01)
*G06F 11/34* (2006.01)

(52) U.S. Cl.
CPC ........ *G06F 11/366* (2013.01); *G06F 9/44521* (2013.01); *G06F 11/3466* (2013.01); *G06F 11/3644* (2013.01); *G06F 11/3688* (2013.01)

(58) Field of Classification Search
CPC . G06F 11/124; G06F 11/3688; G06F 11/3466
USPC ................................................. 717/124, 130
See application file for complete search history.

(56) References Cited

U.S. PATENT DOCUMENTS

| | | | |
|---|---|---|---|
| 7,805,407 B1 * | 9/2010 | Verbeke | G06F 11/2097 707/634 |
| 8,566,800 B2 | 10/2013 | Gagliardi | |
| 8,789,029 B2 | 7/2014 | Ogasawara | |
| 8,793,653 B2 | 7/2014 | Balasubramanian et al. | |
| 8,850,416 B1 | 9/2014 | Colton et al. | |
| 8,869,097 B2 | 10/2014 | Asadullah et al. | |
| 2001/0037417 A1 * | 11/2001 | Meyer | G06F 8/76 719/332 |
| 2007/0038986 A1 * | 2/2007 | Houser | G06F 9/4426 717/151 |
| 2011/0276610 A1 * | 11/2011 | Hossain | G06F 17/30607 707/813 |
| 2011/0276833 A1 * | 11/2011 | Otenko | G06F 11/366 714/38.1 |
| 2011/0283163 A1 * | 11/2011 | Zheng | G06F 11/362 714/763 |
| 2014/0109065 A1 * | 4/2014 | Dantam | G06F 11/362 717/130 |
| 2014/0282419 A1 * | 9/2014 | Yoshida | G06F 11/3604 717/126 |
| 2015/0317167 A1 * | 11/2015 | Zhou | G06F 9/445 717/166 |
| 2016/0055043 A1 * | 2/2016 | Chikabelapur | G06F 11/079 714/37 |

OTHER PUBLICATIONS

Salkeld et al., "Interacting with Dead Objects", 2013.*
Sundararajan, A.; "A. Sundararajan's Weblog: Retrieving .class files from a Java core dump"; Oracle; Apr. 2, 2007; pp. 1-5; <https://blogs.oracle.com/sundararajan/entry/retrieving_class_files_from_a1>.

* cited by examiner

*Primary Examiner* — Phillip H Nguyen
(74) *Attorney, Agent, or Firm* — Alexander G. Jochym

(57) ABSTRACT

A list of classes found in a core dump file is determined. One or more classes requested by a classloader is also determined. A set of one or more classes requested by the classloader that are found in the core dump file is then determined.

14 Claims, 3 Drawing Sheets

USING CORE FILES TO DEVELOP DIAGNOSTIC PROGRAMS

BACKGROUND OF THE INVENTION

The present invention relates generally to the field of software programs, and more particularly to debugging (i.e., finding errors in) a program that does not work correctly.

Programmers write "code" (e.g., software programs, applications, etc.—the generic term 'program' will be used throughout this document) to perform specific tasks, often turning something complex into something simple. It is rare that a program is totally correct the first time it is written and this may lead to the program failing before it successfully completes the task for which it was designed. A program that fails (or crashes) before completion would require the programmer to make changes to the program and to subsequently run it again. This iterative process to correct a program that does not execute properly is known as debugging.

SUMMARY

Embodiments of the present invention include a method, computer program product, and system for resolving classes from a core dump file in order to debug a program. In one embodiment, a list of classes found in a core dump file is determined. One or more classes requested by a classloader is also determined. A set of one or more classes requested by the classloader that are found in the core dump file is then determined.

DETAILED DESCRIPTION

Some embodiments of the present invention recognize that software programs do not always work correctly or as intended. When a program fails, a service engineer (SE) may be called in to analyze the program in order to determine the reason why it did not work correctly. Stated another way, the SE will debug the program to find out why it crashed. Depending on the complexity of the program, debugging may be quick and easy or long and arduous. The debug process may be straight-forward for a simple program. However, the debug process may be complicated and time consuming for a more complex program. For the program user, this means a longer downtime and a more costly resolution to the non-working program.

Embodiments of the present invention offer a mechanism for the debugging of a program that is not working correctly. A program not working properly may crash, hang up, produce incorrect results, run slowly, terminate abnormally, etc. This may be achieved by the SE creating a diagnostic program to use a core dump file in order to determine the cause of the program failure. The diagnostic program provides the SE with a more efficient way to access program state for the crashed program by accessing the bytecodes that define the failing program and the data structures it had created. A core dump file may be requested by a user or created when a program stops running correctly (for example, if the program crashes or runs slowly) and the core dump file consists of the working memory of the computer program or application at that point in time. This method of creating and running the diagnostic program saves the SE time in resolving the problem which in turn saves the program user the expense of continued downtime.

Figure 1:
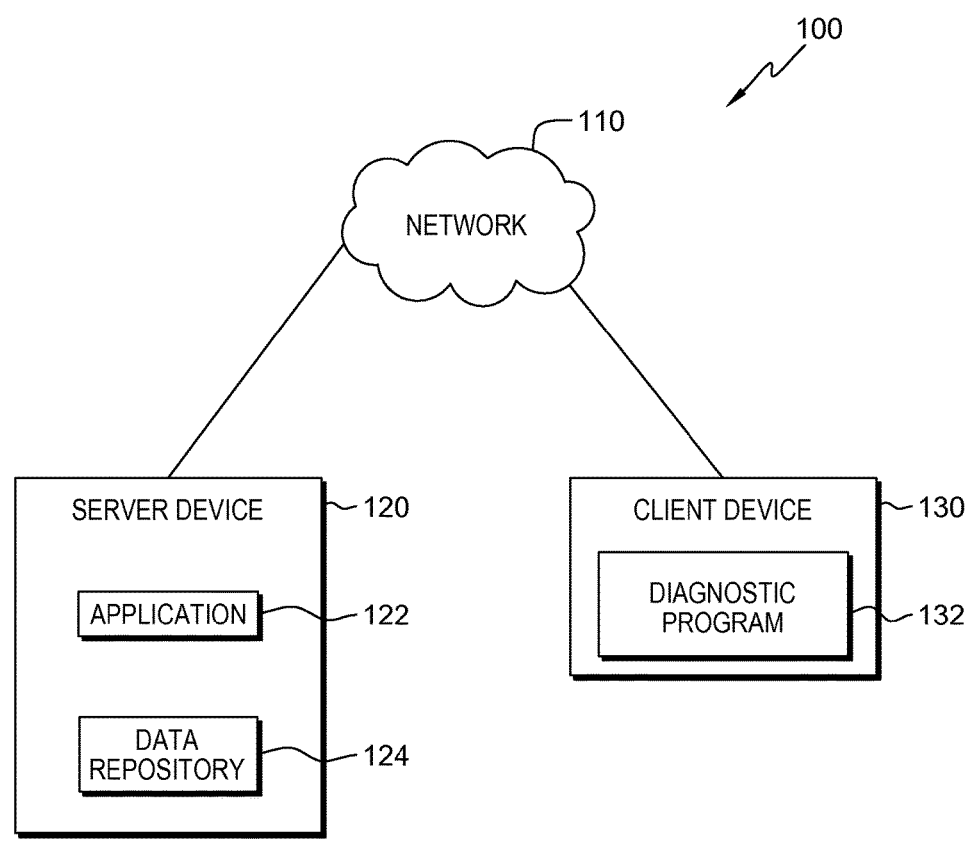
FIG. 1 is a functional block diagram of a computing environment, in accordance with an embodiment of the present invention.

The present invention will now be described in detail with references to the Figures. FIG. 1 is a functional block diagram of a computing environment, generally designated 100, in accordance with an embodiment of the present invention. FIG. 1 provides only an illustration of one implementation and does not imply any limitations with regard to the environments in which different embodiments may be implemented. Those skilled in the art may make many modifications to the depicted environment without departing from the scope of the invention as recited by the claims.

An embodiment of computing environment 100 includes server device 120 and client device 130, interconnected over network 110. In an example embodiment, utilizing network 110, server device 120 may communicate with client device 130. In example embodiments, computing environment 100 can include other computing devices not shown such as smartwatches, cell phones, smartphones, phablets, tablet computers, laptop computers, desktop computers, computer servers or any other computer system known in the art, interconnected with server device 120 and client device 130 over network 110.

In example embodiments, server device 120 and client device 130 may connect to network 110 which enables server device 120 and client device 130 to access other computing devices and/or data not directly stored to server device 120 and client device 130. Network 110 may be a local area network (LAN), a telecommunications network, a wide area network (WAN) such as the Internet, or any combination of the three, and include wired, wireless or fiber optic connections. Network 110 may include one or more wired and/or wireless networks that are capable of receiving and transmitting data, voice, and/or video signals, including multimedia signals that include voice, data, and video information. In general, network 110 can be any combination of connections and protocols that will support communications between server device 120, client device 130, and other computing devices (not shown) within computing environment 100, in accordance with embodiments of the present invention.

According to embodiments of the present invention, server device 120 may be a laptop, tablet or netbook personal computer (PC), a desktop computer, a personal digital assistant (PDA), a smartphone, or any programmable electronic device capable of communicating with any computing device within computing environment 100. In certain embodiments, server device 120 represents a computer system utilizing clustered computers and components (e.g., database server computers, application server computers, etc.) that act as a single pool of seamless resources when accessed by elements of computing environment 100 (e.g., client device 130). In general, server device 120 is representative of any electronic device or combination of electronic devices capable of executing computer readable program instructions. Client device 130 is substantially similar to server device 120 and has substantially similar components. Server device 120 may include components as depicted and described in further detail with respect to FIG. 3, in accordance with embodiments of the present invention.

Server device 120 includes application 122 and data repository 124. In various embodiments of the present invention, server device 120 may run application 122 and store data, either sent or received, from client device 130, to data repository 124.

Application 122 is a program designed to carry out operations to complete a specific task. In various embodiments, application 122 may be a word processor, a spreadsheet system, a database, a smartphone game, an e-mail system, a calendar system, etc. Application 122 cannot run on itself but is dependent on system software to execute. The system software serves the application, which in turn serves the user. Application 122 may be either bundled with a computer and its system software or published separately.

Data repository 124 may be storage that may be written to and/or read by application 122 and diagnostic program 132. In one embodiment, data repository 124 resides on server device 120. In other embodiments, data repository 124 may reside on client device 130, in cloud storage or on another computing device accessible via network 110. In yet another embodiment, data repository 124 may represent multiple storage devices within server device 120. In various embodiments, data repository 124 may be implemented as a database, a collection of files, a knowledge base, an expert system, etc., residing on a database server, a hard disk drive, flash memory, and the like. In an embodiment of the present invention, data sent or received by client device 130 may be stored to data repository 124. For example, a core dump file extracted from application 122 by diagnostic program 132 may be stored to data repository 124.

Client device 130 includes diagnostic program 132 which may be a program, subprogram of a larger program, application, or software component of a software development toolkit which functions to resolve classes from a core dump file in order to debug a program not working correctly.

A software development toolkit (SDK or "devkit") may be a set of software development tools that allows the creation of applications for a certain software package, software framework, hardware platform, computer system, video game console, operating system, or similar development platform. To create applications, a user has to download this software development toolkit.

In object-oriented programming, a class is an extensible program-code-template for creating objects, providing initial values for state (member variables) and implementations of behavior (member functions or methods). In many languages, the class name is used as the name for the class (the template itself), as the name for the default constructor of the class (a subroutine that creates objects), and as the type of objects generated by instantiating the class. These distinct concepts are easily conflated. When a constructor of the class creates an object, the resulting object is called an instance of the class, and the member variables specific to the object are called instance variables, to contrast with the class variables shared across the class.

In an embodiment of the present invention, diagnostic program 132 may be a special purpose program run within a debugging tool to examine execution data of a failing program. A debugging tool (or debugger) is a computer program used to test and debug other programs. According to embodiments of the present invention, diagnostic program 132 analyzes a core dump file to retrieve the object state from the data structures on the heap (i.e., the memory allocated to programs currently running) and the bytecodes required to examine or analyze the data correctly in order to determine why the program is not working correctly. Diagnostic program 132 may be written in a number of programming languages and is not specific to any one particular language. Diagnostic program 132 may be found on client device 130, server device 120, or other computing devices (not shown) accessible on network 110.

Figure 2:
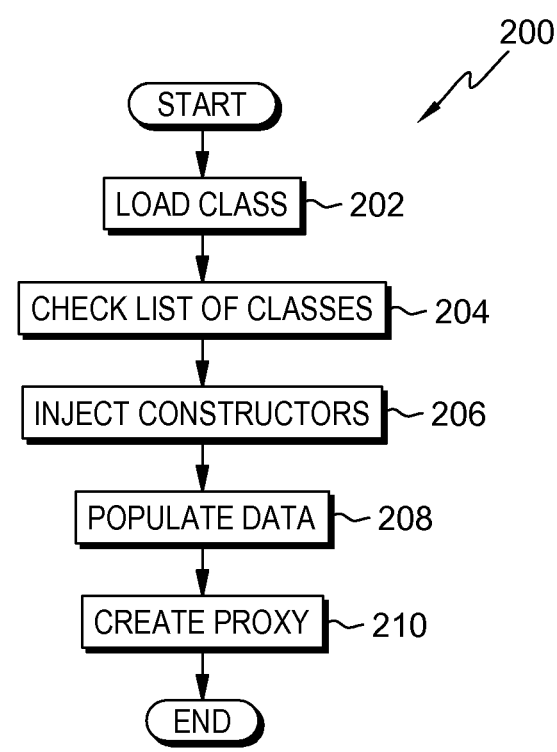
FIG. 2 is a flowchart depicting operational steps of a software component of a development toolkit that functions to resolve classes from a core dump file in order to debug a program that is not working correctly, in accordance with an embodiment of the present invention.

FIG. 2 is a flowchart depicting operational steps 200 of diagnostic program 132 located on client device 130 within computing environment 100 of FIG. 1, a software component of an SDK which functions to resolve classes from a core dump file in order to debug a program that is not working correctly, in accordance with an embodiment of the present invention. In one embodiment, the operational steps are performed by diagnostic program 132. In an alternative embodiment, any other program, while working with diagnostic program 132, may perform the operational steps. In an embodiment, diagnostic program 132 may invoke operational steps 200 when a program stops running before completion. In an alternative embodiment, diagnostic program 132 may invoke operational steps 200 upon the request of a user.

Diagnostic program 132 loads the class (step 202). In other words, diagnostic program 132 obtains the class definition and associated code from a core dump file which was created when the program being debugged stopped working correctly. In one embodiment, the core dump file may contain a single class while in another embodiment, the core dump file may contain multiple classes. In an embodiment of the present invention, a debugging tool (not shown) may be used to examine a core dump file. The class is extracted from the core dump file as the runtime environment cannot locate the class in the normal manner because access to the code used in the failing program is not available. For example, a dump viewer (not shown) or similar tool may be used to open the core dump file and a core file classloader may be used to extract the class from the core dump file which is then used by diagnostic program 132. A classloader is part of a runtime environment that dynamically loads classes into a virtual machine. Runtime begins when a program is opened (or executed) and ends when the program is quit or closed.

Diagnostic program 132 checks the list of classes (step 204). In other words, diagnostic program 132 obtains the list of classes from the core dump file created by the failing program. Diagnostic program 132 also obtains the list of classes requested by the core file classloader. Diagnostic program 132 then determines a set of classes which are both requested by the classloader and found in the core dump file so that the classes in the core dump file may be used rather than the same classes found in an archive file. In an embodiment of the present invention, the list of classes used in the failing program are obtained from a core dump of the failing program using a set of routines, protocols, and tools for building software applications; for example, an API (application programming interface). The API may come in the form of a library that includes specifications for routines, data structures, object classes, and variables and is source-code based. Once the list of classes is obtained, diagnostic program 132 checks to determine whether the core file contains a class with the name requested by the classloader. For example, consider an object "Color" which includes methods isGreen, isRed, and isBlue. The Color interface may be shown as:
interface Color {
   boolean isGreen ( );
   boolean isRed( ); boolean isBlue( );
}
For this example, diagnostic program 132 checks that the class implementing Color exists in the core dump file.

Diagnostic program 132 injects constructors (step 206). In other words, diagnostic program 132 provides special purpose constructors that set object fields to the values the objects had in the failing program at the moment when the core dump file was created (i.e., at the moment the program stopped working correctly). A constructor is a special type of code or subroutine run to create an object from a class. In an embodiment of the present invention, diagnostic program 132 obtains the bytecode for the required class from the core dump file. Then diagnostic program 132 injects the special purpose constructors into the class at runtime by the classloader. The use of the special purpose constructors enables the object to be initialized to the state found in the core dump file. For example, the fields of an instance of the Color object may be initialized from the binary data in the core dump file rather than by parameters from the standard constructors. This allows the fields to have the same values in this instance of the Color object as in the failing object which created the core dump file. In another embodiment, "factory methods" may be used rather than injected constructors. A factory method is a standard technique for creating an object when additional logic is required during object creation.

Diagnostic program 132 populates data (step 208). In other words, diagnostic program 132 uses the special purpose constructors to populate the object fields with data obtained from the core dump file. In an embodiment of the present invention, the instance of the object is recreated for use by diagnostic program 132 with the state that existed in the failing program when the core dump file was created. The special purpose constructors do this by locating the instance of the object within the core dump file and copying the values of the object fields of this instance into the new object. For example, the object 'myColor' is created and may be called in a subsequent step by a diagnostic program.

Diagnostic program 132 creates the proxy (step 210). In other words, diagnostic program 132 creates a proxy for the newly created object which allows for initialization of objects referred to by the original object. A proxy, in its most general form, is a class functioning as an interface to something else. The proxy could interface to anything: a network connection; an object in memory; a file; or some other resource that is expensive or impossible to duplicate. The proxy provides an interface to other objects by creating a "wrapper class" as the proxy. The "wrapper class" (i.e., the proxy) may add additional functionality to the object of interest without changing the code of the object. In short, the proxy is the object that is being called by the client to access the real object behind the scenes. This is required for instances where that object has, as some of its data fields, references to other objects, and those referenced objects are of classes that are not available, in the normal manner (i.e., without using the special purpose constructors), to diagnostic program 132. For example, assume the Color object includes a reference to a String object containing a name of the color. If a diagnostic program attempts to access the referenced String object, the proxy may perform all of the steps which eliminates the need to recreate every object from the crash dump file.

Figure 3:
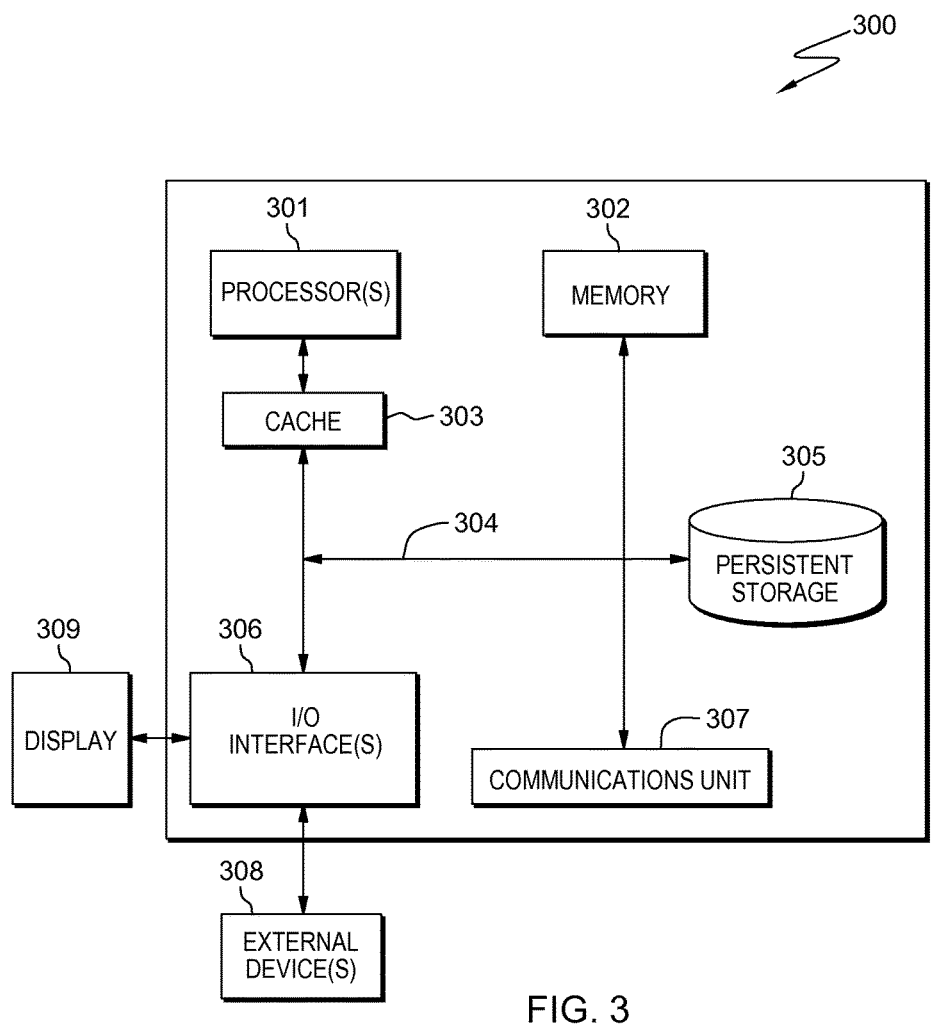
FIG. 3 depicts a block diagram of the components of a computing system representative of the client device and server device of FIG. 1, in accordance with an embodiment of the present invention.

FIG. 3 depicts a block diagram of computer system 300 which is an example of a computer system that may include diagnostic program 132. It should be appreciated that FIG. 3 provides only an illustration of one implementation and does not imply any limitations with regard to the environments in which different embodiments can be implemented. Many modifications to the depicted environment can be made.

Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention (e.g., data repository 124 and diagnostic program 132) may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices, including resources of server device 120. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention (e.g., data repository 124 and diagnostic program 132) can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor. Display 309 can also function as a touchscreen, such as a display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for resolving classes from a core dump file in order to debug a program, the method comprising:
   determining, by one or more computer processors, a list of classes found in a core dump file;
   determining, by one or more computer processors, one or more classes requested by a classloader;
   determining, by one or more computer processors, one or more sets of classes requested by the classloader that are found in the core dump file;
   determining, by one or more computer processors, a constructor for the determined one or more sets of classes;
   locating, by one or more computer processors, an instance of an object in the core dump file, wherein the object is an instance of a class of the one or more sets of classes;
   copying, by one or more computer processors, one or more object fields from the object into a new object; and
   creating, by one or more computer processors, a proxy for initializing the new object using the determined constructor and the copied one or more object fields.

2. The method of claim 1, further comprising:
   determining, by one or more computer processors, a class definition and associated code for the classes found in the core dump file.

3. The method of claim 1, further comprising:
   determining, by one or more computer processors, a factory method for the determined one or more set of classes;
   determining, by one or more computer processors, one or more object fields for the determined one or more sets of classes; and
   creating, by one or more computer processors, a proxy using the determined factory method and the determined one or more object fields.

4. The method of claim 1, wherein the core dump file is a file which consists of a recorded state of a working memory of a computer program at a specific time.

5. The method of claim 4, wherein the specific time is the time when a program terminates abnormally.

6. A computer program product for resolving classes from a core dump file in order to debug program, the computer program product comprising:
   one or more computer readable storage media; and
   program instructions stored on the one or more computer readable storage media, the program instructions comprising:
      program instructions to determine a list of classes found in a core dump file;
      program instructions to determine one or more classes requested by a classloader;
      program instructions to determine one or more sets of classes requested by the classloader that are found in the core dump file;
      program instructions to determine a constructor for the determined one or more sets of classes;
      program instructions to locate an instance of an object in the core dump file, wherein the object is an instance of a class of the one or more sets of classes;
      program instructions to copy one or more object fields from the object into a new object; and
      program instructions to create a proxy for initializing the new object using the determined constructor and the copied one or more object fields.

7. The computer program product of claim 6, further comprising program instructions, stored on the one or more computer readable storage media, to:
   determine a class definition and associated code for the classes found in the core dump file.

8. The computer program product of claim 6, further comprising program instructions, stored on the one or more computer readable storage media, to:
   determine a factory method for the determined one or more sets of classes;
   determine one or more object fields for the determined one or more sets of classes; and
   create a proxy using the determined factory method and the determined one or more object fields.

9. The computer program product of claim 6, wherein the core dump file is a file which consists of a recorded state of a working memory of a computer program at a specific time.

10. The computer program product of claim 9, wherein the specific time is the time when a program terminates abnormally.

11. A computer system for resolving classes from a core dump file in order to debug a program, the computer system comprising:
    one or more computer processors;
    one or more computer readable storage media; and
    program instructions stored on the one or more computer readable storage media for execution by at least one of the one or more computer processors, the program instructions comprising:
       program instructions to determine a list of classes found in a core dump file;
       program instructions to determine one or more classes requested by a classloader;
       program instructions to determine one or more sets of classes requested by the classloader that are found in the core dump file;
       program instructions to determine a constructor for the determined one or more sets of classes;
       program instructions to locate an instance of an object in the core dump file, wherein the object is an instance of a class of the one or more sets of classes;
       program instructions to copy the one or more object fields from the object into a new object; and
       program instructions to create a proxy for initializing the new object using the determined constructor and the copied one or more object fields.

12. The computer system of claim 11, further comprising program instructions, stored on the one or more computer readable storage media for execution by at least one of the one or more computer processors, to:
    determine a class definition and associated code for the classes found in the core dump file.

13. The computer system of claim 11, further comprising program instructions, stored on the one or more computer readable storage media for execution by at least one of the one or more computer processors, to:
- determine a factory method for the determined one or more sets of classes;
- determine one or more object fields for the determined one or more sets of classes; and
- create a proxy using the determined factory method and the determined one or more object fields.

14. The computer system of claim 11, wherein the core dump file is a file which consists of a recorded state of a working memory of a computer program at a specific time.

\* \* \* \* \*